US012184006B2

(12) United States Patent
Meyer et al.

(10) Patent No.: US 12,184,006 B2
(45) Date of Patent: Dec. 31, 2024

(54) CONDUCTOR CONNECTION TERMINAL HAVING FIRST AND SECOND HOUSINGS WITH ELECTRICALLY JOINED BUSBARS

(71) Applicant: WAGO Verwaltungsgesellschaft mbH, Minden (DE)

(72) Inventors: Michael Meyer, Wiedensahl (DE); Hans-Josef Koellmann, Minden (DE); Gunter Spey, Heuerssen (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 331 days.

(21) Appl. No.: 17/726,174

(22) Filed: Apr. 21, 2022

(65) Prior Publication Data

US 2022/0344852 A1 Oct. 27, 2022

(30) Foreign Application Priority Data

Apr. 23, 2021 (DE) ..................... 10 2021 110 424.6

(51) Int. Cl.

| | |
|---|---|
| ***H01R 4/48*** | (2006.01) |
| ***H01R 9/24*** | (2006.01) |
| ***H01R 13/436*** | (2006.01) |
| ***H01R 13/516*** | (2006.01) |
| ***H01R 25/14*** | (2006.01) |

(52) U.S. Cl.

CPC ......... *H01R 13/4361* (2013.01); *H01R 4/484* (2023.08); *H01R 13/516* (2013.01); *H01R 25/14* (2013.01); *H01R 4/4809* (2013.01); *H01R 4/4821* (2023.08); *H01R 4/483* (2023.08); *H01R 4/485* (2023.08); *H01R 9/2458* (2013.01)

(58) Field of Classification Search

CPC H01R 13/4361; H01R 13/516; H01R 15/162; H01R 4/4809; H01R 9/2458

See application file for complete search history.

(56) References Cited

U.S. PATENT DOCUMENTS

| | | | | | |
|---|---|---|---|---|---|
| 4,728,295 | A * | 3/1988 | Henrici | ................ | H01R 9/2491 439/409 |
| 5,716,241 | A * | 2/1998 | Hennemann | ......... | H05K 7/1468 439/716 |

(Continued)

FOREIGN PATENT DOCUMENTS

| | | | |
|---|---|---|---|
| DE | 29500566 | U1 | 3/1995 |
| DE | 19650989 | A1 | 6/1998 |
| DE | 102013101406 | A1 | 8/2014 |

*Primary Examiner* — Vanessa Girardi

(74) *Attorney, Agent, or Firm* — Muncy, Geissler, Olds & Lowe, P.C.

(57) ABSTRACT

A conductor connection terminal having a first insulating material housing and a second insulating material housing. The first and the second insulating material housings each have a plurality of conductor insertion openings arranged side by side for inserting an electrical conductor in a conductor insertion direction into the insulating material housing. The first insulating material housing has a first busbar and the second insulating material housing has a second busbar, and at least two conductor insertion openings of the first insulating material housing and the second insulating material housing are each associated with a clamping spring having a clamping leg. The clamping leg and the respective busbar form a clamping point for an electrical conductor to be clamped.

13 Claims, 9 Drawing Sheets

(56) References Cited

U.S. PATENT DOCUMENTS

| | | | | |
|---|---|---|---|---|
| 6,027,379 | A | 2/2000 | Hohorst | |
| 6,783,403 | B2 * | 8/2004 | Lafragette | H01R 4/48275<br>439/717 |
| 9,124,034 | B2 * | 9/2015 | Kollmann | H01R 13/42 |
| 9,543,700 | B2 * | 1/2017 | Köllmann | H01R 4/48365 |
| 9,825,402 | B2 | 11/2017 | Koellmann et al. | |
| 10,505,295 | B2 * | 12/2019 | Moser | H01R 13/639 |

* cited by examiner

CONDUCTOR CONNECTION TERMINAL HAVING FIRST AND SECOND HOUSINGS WITH ELECTRICALLY JOINED BUSBARS

This nonprovisional application claims priority under 35 U.S.C. § 119(a) to German Patent Application No. 10 2021 110 424.6, which was filed in Germany on Apr. 23, 2021, and which is herein incorporated by reference.

BACKGROUND OF THE INVENTION

Field of the Invention

The present invention relates to a conductor connection terminal having a first insulating material housing and a second insulating material housing, wherein the first and the second insulating material housing each have a plurality of side by side conductor insertion openings for inserting an electrical conductor in a conductor insertion direction into the insulating material housing and wherein the first insulating material housing has a first base side and the second insulating material housing has a second base side, wherein the first base side and the second base side are facing each other, wherein the first insulating material housing has a first busbar and the second insulating material housing has a second busbar, wherein at least two conductor insertion openings of the first insulating material housing and the second insulating material housing are each associated with a clamping spring having a clamping leg, wherein the clamping leg and the respective busbar form a clamping point for an electrical conductor to be clamped and wherein the busbar of the first insulating material housing electrically connects the clamping points in the first insulating material housing and the busbar of the second insulating material housing electrically connects the clamping points in the second insulating material housing with each other.

SUMMARY OF THE INVENTION

It is therefore an object of the present invention to provide an improved conductor connection terminal.

In the case of the generic conductor connection terminal, it is proposed that at least one first contact opening is arranged on the first base side of the first insulating material housing and at least one second contact opening is arranged on the second base side of the second insulating material housing and that at least one contact element penetrates the first contact opening and the second contact opening, wherein the contact element electrically conductively connects the first busbar and the second busbar.

By means of the contact openings of the base sides of the first insulating material housing and the second insulating material housing and the contact element connecting the first busbar and the second busbar, a conductor connection terminal with a plurality of poles can be provided in a simple design. In particular, a conductor connection terminal with a plurality of poles in width can be provided. It is conceivable that the first insulating material housing and the second insulating material housing are structurally identical, whereby the structural complexity can be further reduced.

In the following, the term insulating material housing is used for the first insulating material housing and the second insulating material housing. Thus, the term insulating material housing may include the first insulating material housing and/or the second insulating material housing.

It is conceivable that the base side and side of the insulating material housing having the conductor insertion openings are different housing sides. The conductor insertion openings arranged side by side are thus arranged on one side of the insulating material housing, which is different from the base side. The side of the insulating material housing having the conductor insertion openings can be adjacent to the base side.

The base side of the first insulating material housing and the base side of the second insulating material housing can touch each other directly. However, it is also conceivable that there is no direct contact. For example, it is possible that the base sides of the first insulating material housing and the second insulating material housing are separated from each other by another component and still face each other.

Both the first busbar and the second busbar connect the clamping points of the respective insulating material housing. The first busbar and the second busbar thus run transversely to the conductor insertion openings, so that the busbar is essentially the same distance from each of the conductor insertion openings. The first busbar and the second busbar can be arranged adjacent to the base side of the respective insulating material housing. Adjacent can mean in particular that the base side of the respective insulating material housing is arranged near the busbar, so that the busbar is at an essentially constant distance to the base side. In particular, adjacent does not mean that the busbar and the base side have to touch each other. However, it is conceivable that the busbar rests against the base side.

The contact element can be formed as a spring contact element. In particular, at least one contact tongue for electrically conductive contacting of the first busbars of the first insulating material housing and the second busbar of the second insulating material housing may protrude from the spring contact element. Furthermore, it is advantageous if two contact tongues protrude from the spring contact element, wherein at the free end of the contact tongues in each case a contact tab for electrically conductive contacting of the first busbars of the first insulating material housing and the second busbar of the second insulating material housing is arranged.

By forming a spring contact element, the contact element can be easily and precisely mounted through the contact openings of the base sides, so that the first busbar of the first insulating material housing and the second busbar of the second insulating material housing are contacted electrically conductively.

The contact element can be U-shaped or V-shaped. Alternatively, the spring contact element may be formed, for example, as a spiral spring. The contact element can also be designed as a pin contact in a conceivable design.

In particular, it is conceivable that in a top view on the base side of the insulating material housing, the contact element is U-shaped or V-shaped.

The first insulating material housing and the second insulating material housing may be directly or indirectly fixed to each other.

The first insulating material housing and the second insulating material housing can, for example, be directly fixed to each other via a latching connection.

However, it is also conceivable that the first insulating material housing and the second insulating material housing are formed to be fixed to each other at least indirectly via, for example, a connecting plate, wherein the connecting plate may be arranged between the first insulating material housing and the second insulating material housing and also have a corresponding opening for the contact element.

The first base side of the first insulating material housing and the second base side of the second insulating material housing can be connected to each other in a material-locking manner.

A material connection is in particular a connection in which the first insulating material housing and the second insulating material housing are held together by atomic or molecular forces, wherein the connection cannot be dissolved non-destructively.

The first insulating material housing and the second insulating material housing can, for example, be connected to each other via an adhesive connection, or a weld and/or solder joint.

The first base side of the first insulating material housing and the second base side of the second insulating material housing may each be arranged on opposite sides of a connecting element. Further advantageously, the first base side of the first insulating material housing and/or the second base side of the second insulating material housing may have a latching opening, wherein the latching opening is formed for latching with a corresponding latching crosspiece of the connecting element.

It is conceivable that the base sides of the first insulating material housing and the second insulating material housing are each snapped onto opposite sides of the connecting element. The connecting element has at least one passage opening for the contact element corresponding to the contact opening of the base sides of the insulating material housings of the conductor connection terminals. The connecting element may be formed as the connecting plate described above between the first insulating material housing and the second insulating material housing.

In particular, two latching openings may be arranged on the base side of the first insulating material housing and the second insulating material housing, wherein the latching openings are formed with two corresponding latching crosspieces on, in each case, opposite sides of the connecting element for latching.

A second latching opening may be arranged on the connecting element, wherein the second latching opening is formed for latching with a corresponding second latching crosspiece, wherein the second latching crosspiece is arranged on the first base side of the first insulating material housing and/or on the second base side of the second insulating material housing.

The formation of a second latching opening on the connecting element and a second latching crosspiece on the base side of the first insulating material housing and/or on the base side of the second insulating material housing is the inverse formation to the embodiment of the first latching opening and the first latching crosspiece described above.

It is conceivable that each of the embodiments exists on its own. However, it is also possible that both embodiments exist side by side. Thus, on the base side of the first insulating material housing and/or the second insulating material housing, both a latching opening and a second latching crosspiece can be arranged, which can form a latching on the connecting element with a corresponding latching crosspiece and a corresponding second latching opening.

A recess may be arranged on the first busbar and/or on the second busbar, wherein the contact element for contacting the respective busbar is arranged in the recess.

In the recess, the contact element can be arranged in a space-saving manner. In addition, the contact element can be safely mounted in the recess, so that electrically conductive contacting of the first busbar and the second busbar can be guaranteed.

The contact element can contact the first busbar and/or the second busbar by force.

A force-locking connection can be made in particular by a press connection. The press connection between the contact element and the first busbar and/or the second busbar can be achieved in particular via the spring contact element described above by using the spring force to press the spring contact element to the first busbar and/or the second busbar.

In this way, a safe contacting of the first busbar and the second busbar by means of the contact element can be achieved, wherein the connection can also be released again if necessary.

The first insulating material housing and/or the second insulating material housing may have at least one actuation element, wherein the actuation element has an actuation arm for manual actuation and wherein the actuation element is set up to open and/or close the clamping point, wherein the actuation arm extends along the side of the first insulating material housing opposite the first base side and/or along the side of the second insulating material housing opposite the second base side.

The conductor connection terminal can have an actuation element formed as an actuation lever having an actuation arm, by which at least one clamping leg of a clamping spring can be shifted from an open position to a closed position and/or vice versa. In this way, a simplified actuation can be provided.

The actuation element may have an actuation section, wherein the actuation section is arranged to the side of the clamping spring and wherein an actuation contour of the actuation section is in active connection with the clamping leg.

Furthermore, it is advantageous if the actuation contour has a circumferentially circular or partially circular cone with a V-shaped cut-out, wherein the clamping leg protrudes with an actuation section into the V-shaped cut-out.

In this way, an actuation element can be provided that causes the first contact point to be opened and closed by lifting or lowering the clamping leg of the clamping spring.

The undefined term "a" is to be understood as such and not as a number word. Thus, it is also conceivable that the base sides of the first insulating material housing and/or the second insulating material housing each have two contact openings. In this way, the first busbar of the first insulating material housing and the second busbar of the second insulating material housing can be electrically conductively connected to each other via two contact elements, for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
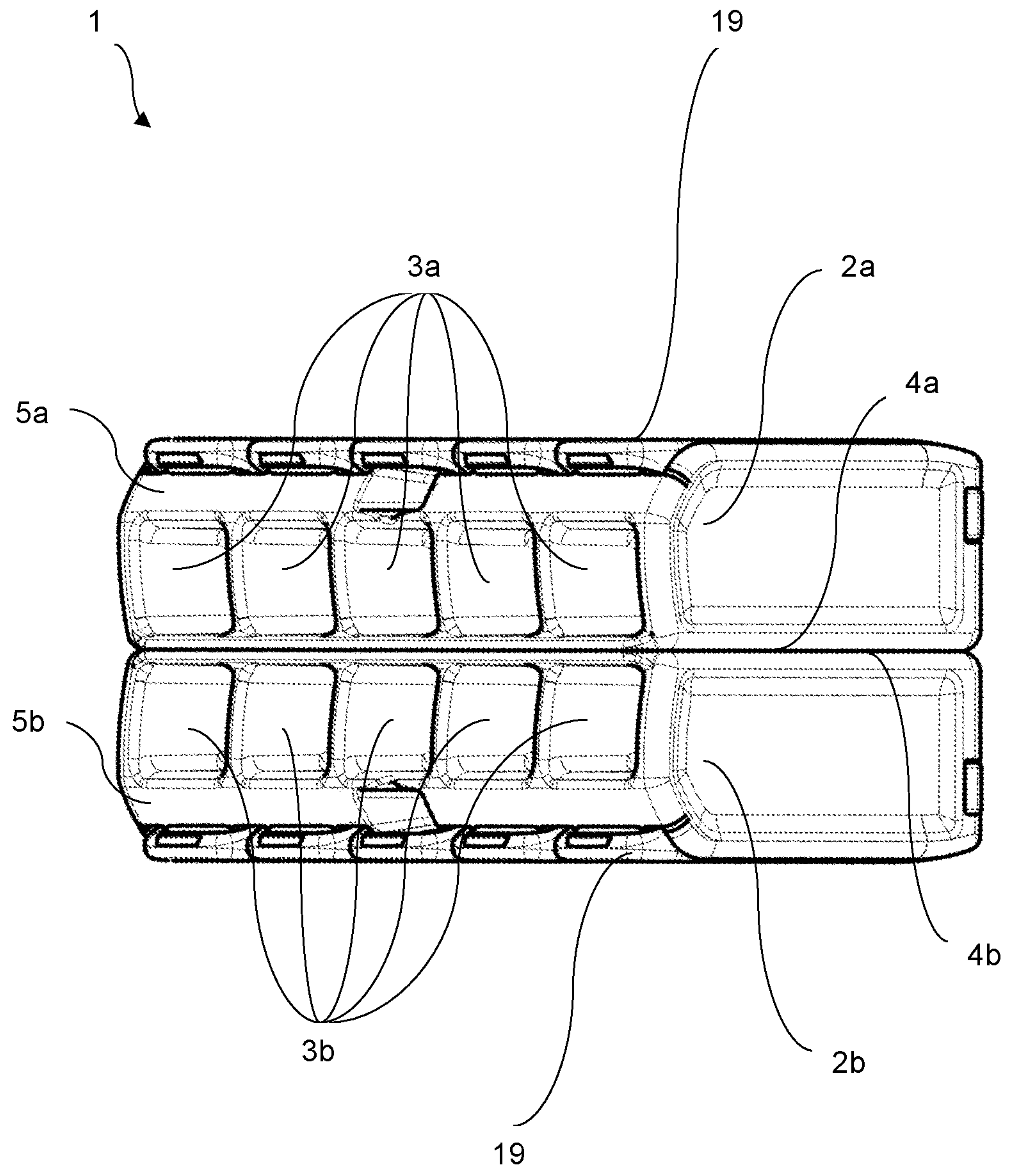
FIG. 1 shows a conductor connection terminal according to the invention in a perspective view.

FIG. 1 shows a conductor connection terminal 1 in an exemplary embodiment in a perspective view. The conductor connection terminal 1 has a first insulating material housing 2*a* and a second insulating material housing 2*b*, wherein the first insulating material housing 2*a* and the second insulating material housing 2*b* each have five conductor insertion openings 3*a*, 3*b* side by side for inserting an electrical conductor in a conductor insertion direction into the respective insulating material housing 2*a*, 2*b*. However, fewer, or more conductor insertion openings 3*a*, 3*b*, such as two or three conductor insertion openings 3*a*, 3*b* on each first and second insulating material housing 2*a*, 2*b*, are also conceivable.

It becomes clear that the first insulating material housing 2*a* has a first base side 4*a* and the second insulating material housing 2*b* has a second base side 4*b*, wherein the first base side 4*a* and the second base side 4*b* face each other. The first base side 4*a* and the second base side 4*b* touch each other directly, i.e., without another element arranged in between. However, it is also conceivable that, for example, a connecting plate is arranged between the first base side 4*a* and the second base side 4*b*.

Furthermore, it becomes clear that the side 5*a* of the first insulating material housing 2*a* and the side 5*b* of the second insulating material housing 2*b* having the conductor insertion openings 3*a*, 3*b* is a side 5*a*, 5*b* that is different from the base sides 4*a*, 4*b*. Sides 5*a*, 5*b* of the first and second insulating material housing 2*a*, 2*b* having the conductor insertion openings 3*a*, 3*b* are adjacent to the respective base side 4*a*, 4*b* of the first insulating material housing 2*a* and the second insulating material housing 2*b*.

The side 5*a* having the conductor insertion openings 3*a* of the first insulating material housing 2*a* and the side 5*b* having the conductor insertion openings 3*b* of the second insulating material housing 2*b* are preferably aligned to the same direction, so that electrical conductors from the same direction can be led both into the first insulating material housing 2*a* and into the second insulating material housing 2*b*. The conductor insertion openings 3*a*, 3*b* of the first insulating material housing 2*a* and the second insulating material housing 2*b* are thus arranged on the same side of the conductor connection terminal 1.

Figure 2:
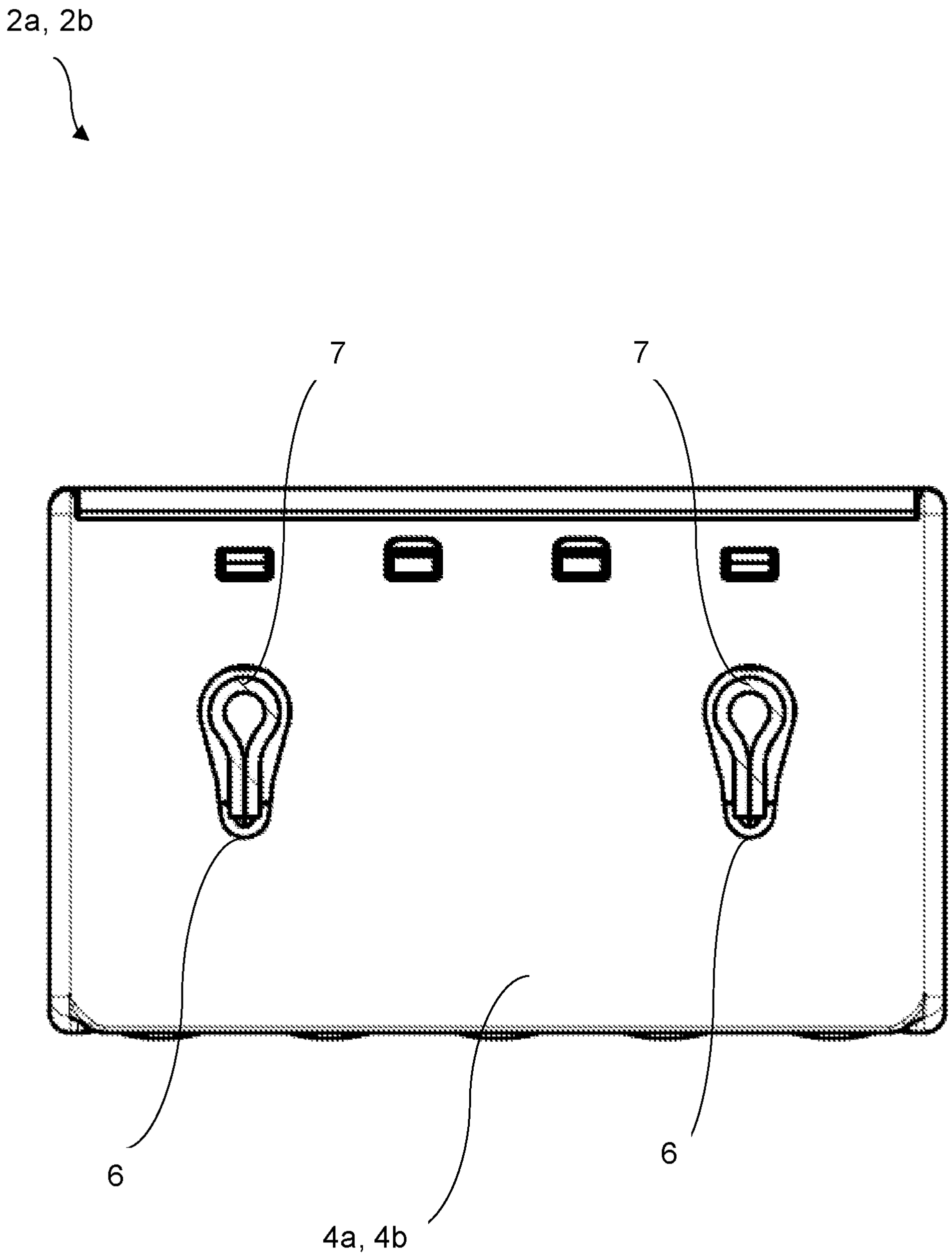
FIG. 2 shows an insulating material housing for a conductor connection terminal according to FIG. 1 in a sub-view.

FIG. 2 shows an insulating material housing 2*a*, 2*b* for a conductor connection terminal 1 according to FIG. 1 in a sub-view. The insulating material housing 2*a*, 2*b* shown may be both the first insulating material housing 2*a* and the second insulating material housing 2*b* since these have an identical structure according to FIG. 1.

The base side 4*a*, 4*b* of the insulating material housing 2*a*, 2*b* can be seen. It becomes clear that on the base side 4*a*, 4*b* two contact openings 6 are arranged, wherein in each of the contact openings 6 a spring contact element 7 is arranged. According to FIG. 1, the base sides 4*a*, 4*b* of the first insulating material housing 2*a* and the second insulating material housing 2*b* are arranged facing each other. The spring contact elements 7 thus penetrate the contact openings 6 of both base sides 4*a*, 4*b* of the first and second insulating material housing 2*a*, 2*b*.

Figure 3:
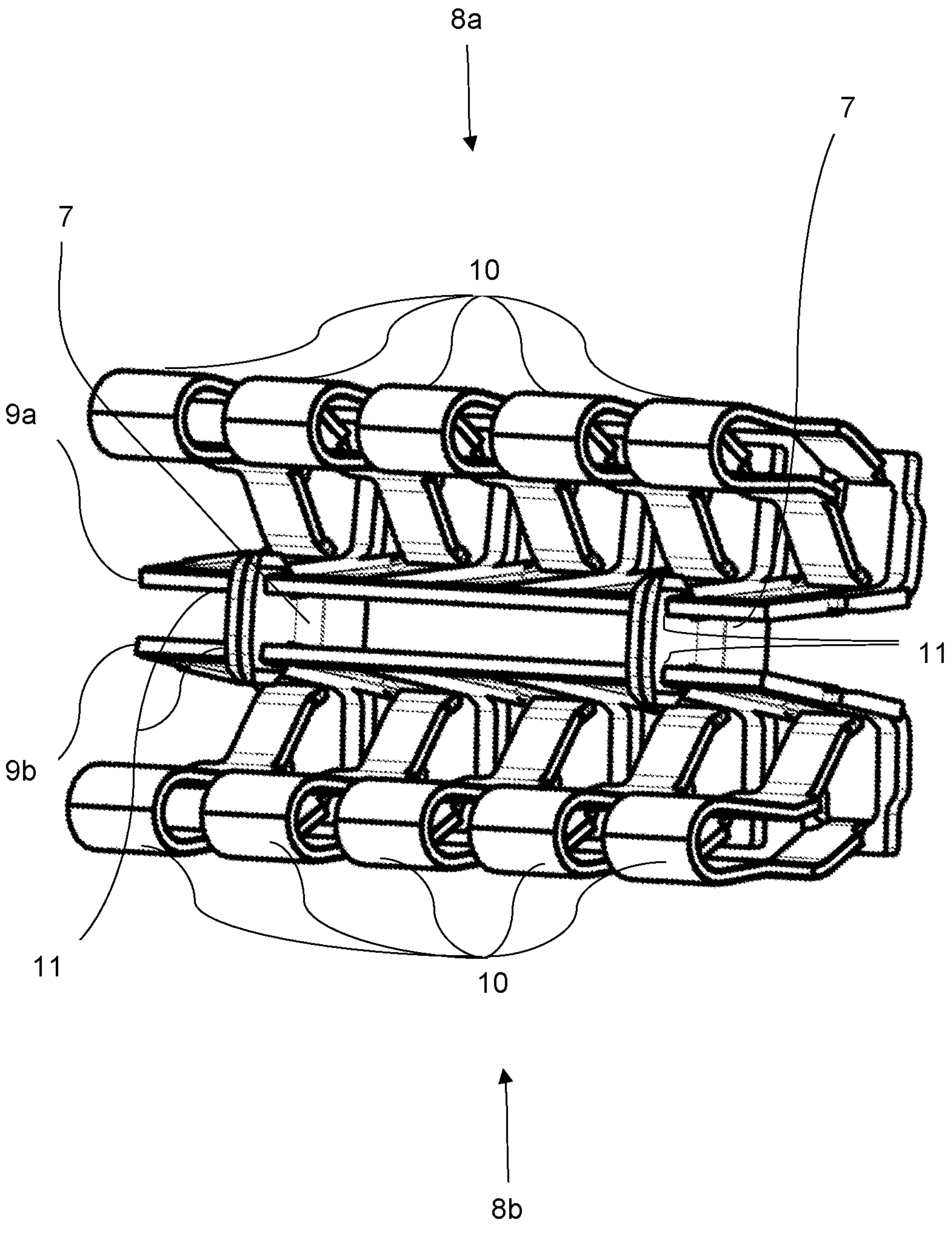
FIG. 3 shows two contact inserts for a conductor connection terminal according to FIG. 1 in a perspective view.
Figure 4:
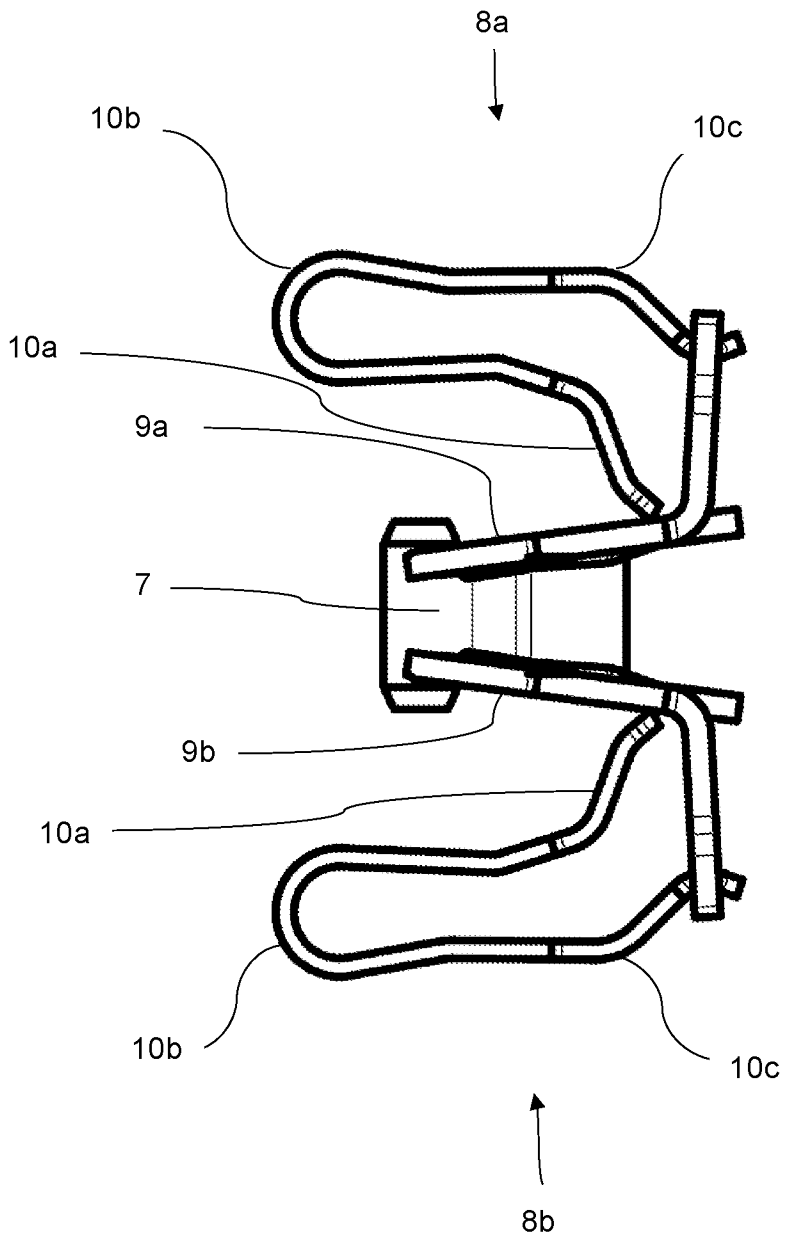
FIG. 4 shows contact inserts according to FIG. 3 in a side view.

FIG. 3 shows a first contact insert 8*a* for use in the first insulating material housing 2*a* according to FIG. 1 and a second contact insert 8*b* for use in the second insulating material housing 2*b* according to FIG. 1 in a perspective view. FIG. 4 shows the first contact insert 8*a* and the second contact insert 8*b* according to FIG. 3 in a side view. The structure of the first contact insert 8*a* is preferably identical to the structure of the second contact insert 8*b*.

The first contact insert 8*a* has a first busbar 9*a* and the second contact insert has a second busbar 9*b*. The first contact insert 8*a* and the second contact insert 9*b* each have five clamping springs 10, wherein each of the clamping springs 10 has a clamping leg 10*a* and wherein the clamping leg 10*a* and the respective busbar 9*a*, 9*b* form a clamping point for the electrical conductor to be clamped. The clamping leg 10*a* merges into a spring arc 10*b*, which extends into a contact leg 10*c*.

With reference to FIG. 1, each of the conductor insertion openings 3*a*, 3*b* of the first insulating material housing 2*a* and the second insulating material housing 2*b* are associated with a clamping spring 10 having a clamping leg 10*a* to form a clamping point. The first busbar 9*a* electrically connects the clamping points of the first insulating material housing 2*a* with each other, wherein the second busbar 9*b* electrically connects the clamping points of the second insulating material housing 2*b* with each other. However, it is also conceivable that not every conductor insertion opening 3*a*, 3*b* is associated with a clamping spring 10. For example, only four out of five conductor insertion openings 3*a*, 3*b* of the first insulating material housing 2*a* and the second insulating material housing 2*b* can each be associated with a clamping spring 10.

It becomes clear that on the first busbar 9*a* and on the second busbar 9*b* in each case two recesses 11 are arranged, wherein the spring contact element 7 is arranged in the respective recess 11 for contacting the respective busbar 9*a*, 9*b*. The design of the spring contact element 7 allows this to be easily mounted in the recess 11, wherein the spring contact element 7 force-fittingly contacts the first busbar 9*a* and the second busbar 9*b* by means of the spring force of the spring contact element 7.

Figure 5A:
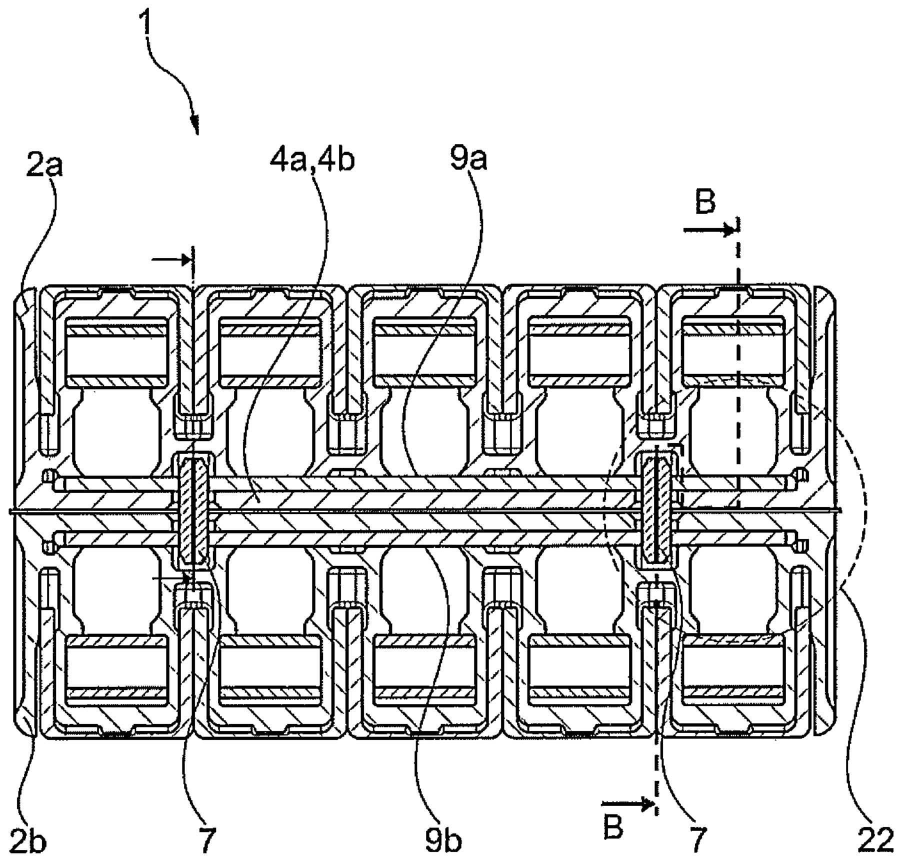
FIG. 5*a* shows a conductor connection terminal according to FIG. 1 with two contact inserts according to FIGS. 3 and 4 in a lateral section view.
Figure 5B:
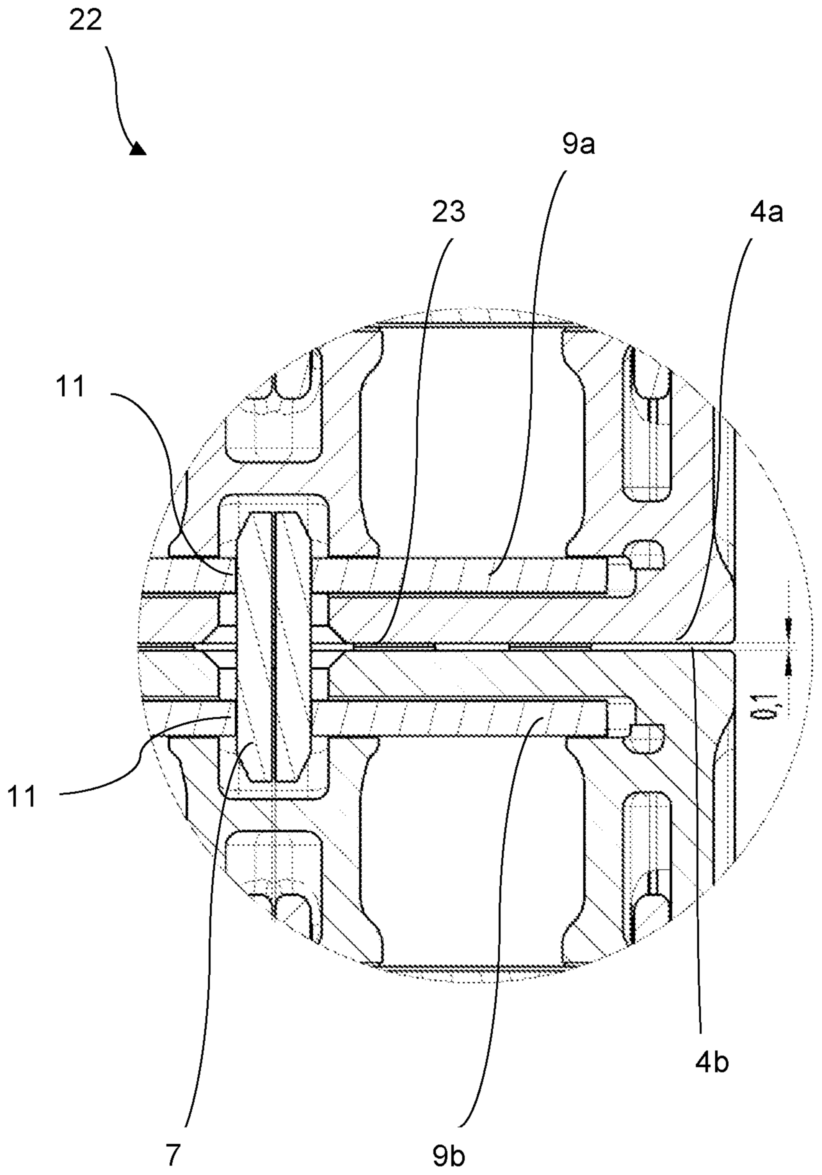
FIG. 5*b* shows an enlarged section of a clamping point of FIG. 5*a;*

FIG. 5*a* shows a conductor connection terminal 1 according to FIG. 1 having two contact inserts 8*a*, 8*b* according to FIGS. 3 and 4 in a lateral section view, wherein FIG. 5*b* shows an enlarged cutout 22 of a clamping point of FIG. 5*a*.

It becomes clear that in both the first busbar 9*a* and the second busbar 9*b* two recesses 11 are arranged, wherein within the recess 11 the spring contact element 7 is arranged. The spring force of the spring contact element 7 presses the spring contact element 7 to the first and second busbar 9*a*, 9*b*, so that a force-locked connection between the spring contact element 7 and the first and second busbar 9*a*, 9*b* is formed.

The first insulating material housing 2*a* and the second insulating material housing 2*b* can be connected to each other via a material connection on the facing base sides 4*a*, 4*b*. The material connection can be made, for example, via a weld joint 23.

Figure 6:
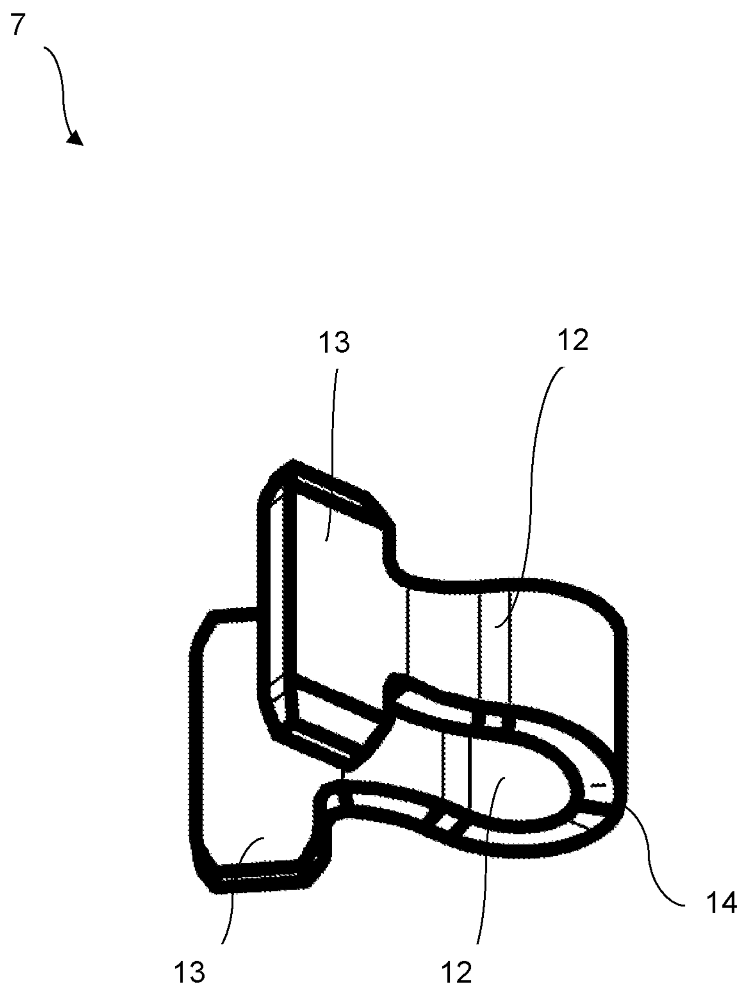
FIG. 6 shows a contact element for a conductor connection terminal according to FIG. 1 in a perspective view.

FIG. 6 shows a spring contact element 7 for a conductor connection terminal 1 according to FIG. 1 for contacting a first busbar 9*a* and a second busbar 9*b* according to FIGS. 3 and 4. It becomes clear that the spring contact element 7 is U-shaped. The spring contact element 7 has two contact tongues 12, wherein from the free ends of the contact tongues 12 in each case a contact tab 13 protrudes for electrically conductive contacting of the first busbar 9*a* of the first insulating material housing 2*a* and the second busbar 9*b* of the second insulating material housing 9*b*. The contact tongues 12 are connected to each other via a common contact arc 14.

The contact tabs 13 are formed to be broader than the contact tongues 12 of the spring contact element 7, wherein the contact tab 13 is bent from the respective contact tongue 12. The contact tabs 13 are oriented away from each other. In this way, reliable electrically conductive contacting of the first busbar 9*a* and the second busbar 9*b* can be ensured.

In a synopsis of FIGS. 1 to 6, it becomes clear that a conductor connection terminal 1 can be provided in a simple and constructive manner with a large number of pole points.

It becomes clear that on the first insulating material housing 2*a* and on the second insulating material housing 2*b* actuation elements are arranged, wherein each actuation element has an actuation arm 19 for manual actuation and wherein the actuation element is set up to open and/or close the clamping point. The actuation arms 19 of the first insulating material housing 2*a* extend with the clamping point closed along the side of the first insulating material housing 2*a* opposite the first base side 4*a*. The actuation arms 19 of the second insulating material housing 2*b* extend with the clamping point closed along the side of the second insulating material housing 2*b* opposite the second base side 4*b*.

Figure 7:
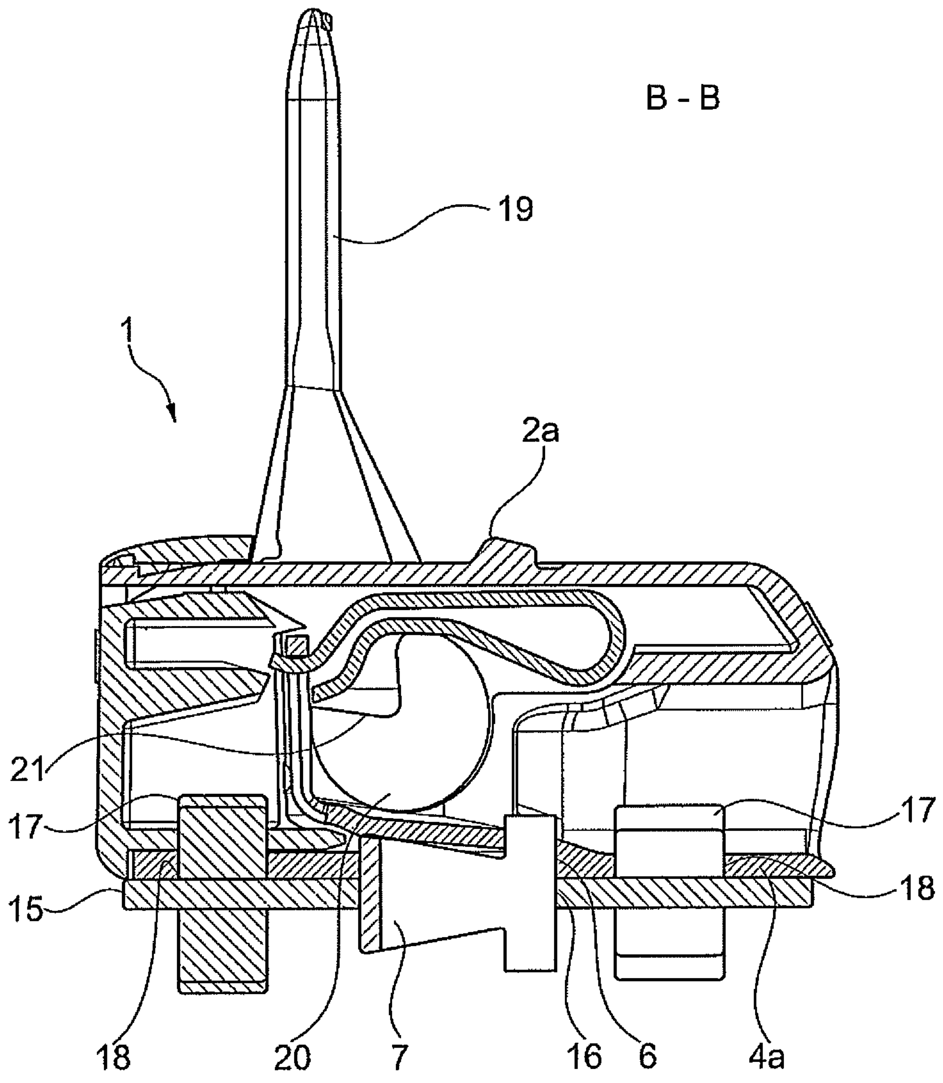
FIG. 7 shows an insulating material housing with a connecting element for a conductor connection terminal in a side cross-sectional view taken along line B-B of FIG. 5*a;*
Figure 8:
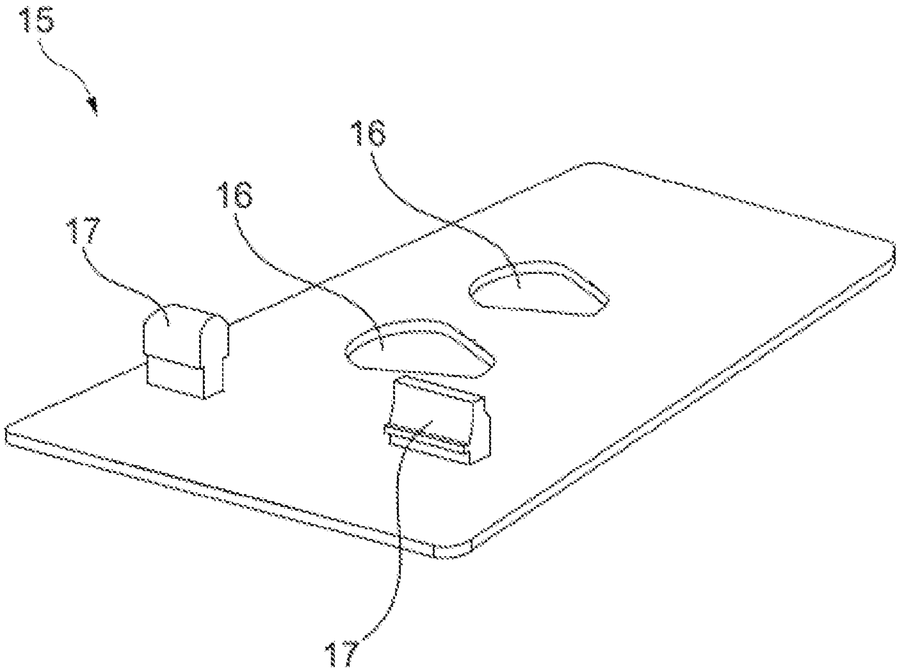
FIG. 8 shows a connecting element according to FIG. 7 in a perspective view.

FIG. 7 shows a first insulating material housing 2*a* having a connecting element 15 for a conductor connection terminal 1 in an exemplary embodiment in a side cross-sectional view taken along line B-B of FIG. 5*a*, wherein FIG. 8 shows the connecting element 15 according to FIG. 7 in a perspective view.

In contrast to the first embodiment according to FIG. 1, the base side 4*a* of the first insulating material housing 2*a* is not directly adjacent to a second insulating material housing but is only indirectly adjacent due to the intermediate connecting element 15. The connecting element 15 is designed as a connecting plate, wherein the connecting plate has a passage opening 16 corresponding to the contact opening 6 of the base side, wherein the spring contact element 7 penetrates the passage opening 16 and the contact opening 6.

On the connecting plate, latching crosspieces 17 are arranged, wherein on the first insulating material housing 2*a* corresponding latching recesses 18 are arranged, which are designed to latch with the latching crosspieces 17. Latching crosspieces 17 are arranged on opposite sides of the connecting plate in order to snap both the first insulating material housing 2*a* and a second insulating material housing 2*b* to the connecting plate on opposite sides. The latching allows for the possibility to detachably connect the first insulating material housing 2*a* and the second insulating material housing 2*b* to each other.

An actuation element with an actuation arm 19 is associated with a clamping point of the first insulating material housing 2*a*. It becomes clear that the actuation element has an actuation section 20, wherein the actuation section 20 is arranged laterally of the clamping spring 10 and wherein an actuation contour 21 of the actuation section 20 is in active connection with the clamping leg 10*a* of the clamping spring 10.

The actuation contour 21 is formed circumferentially circular or semi-circular with a V-shaped cutout, wherein the clamping leg 10*a* can protrude into the V-shaped cutout. In particular, an actuation tab protruding from the clamping leg 10*a* can protrude into the V-shaped cutout. The formation of the actuation element of the second embodiment according to FIG. 6 may also correspond to the formation of the first embodiment according to FIG. 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conductor connection terminal comprising:

a first insulating material housing; and a second insulating material housing, wherein the first and the second insulating material housing each have a plurality of conductor insertion openings arranged side by side for inserting an electrical conductor in a conductor insertion direction into the respective insulating material housing, wherein the first insulating material housing has a first base side, and the second insulating material housing has a second base side, wherein the first base side and the second base side face each other, wherein the first insulating material housing has a first busbar, and the second insulating material housing has a second busbar, wherein at least two conductor insertion openings of the first insulating material housing and the second insulating material housing are each associated with a clamping spring having a clamping leg, the clamping leg and the respective busbar form a clamping point for the respective electrical conductor to be clamped, wherein the first busbar of the first insulating material housing electrically connects the clamping points in the first insulating material housing and the busbar of the second insulating material housing electrically connects the clamping points in the second insulating material housing, wherein at least one first contact opening is arranged on the first base side of the first insulating material housing and at least one second contact opening is arranged on the second base side of the second insulating material housing, wherein at least one contact element penetrates the first contact opening and the second contact opening, and wherein the contact element electrically conductively connects the first busbar and the second busbar.

2. The conductor connection terminal according to claim 1, wherein the contact element is U-shaped or V-shaped.

3. The conductor connection terminal according to claim 1, wherein a recess is arranged on the first busbar and/or on the second busbar, and wherein the contact element for contacting the respective busbar is arranged in the recess.

4. The conductor connection terminal according to claim 1, wherein the contact element force-fittingly contacts the first busbar and/or the second busbar.

5. The conductor connection terminal according to claim 1, wherein the first insulating material housing and/or the second insulating material housing has at least one actuation element, wherein the actuation element has an actuation arm for manual actuation and wherein the actuation element is set up to open and/or close the clamping point, wherein the actuation arm extends along a side of the first insulating material housing opposite the first base side and/or along the side of the second insulating material housing opposite the second base side.

6. The conductor connection terminal according to claim 1, wherein the contact element is formed as a spring contact element.

7. The conductor connection terminal according to claim 6, wherein at least one con-tact tongue for electrically conductive contacting of the first busbar of the first insulating material housing and the second busbar of the second insulating material housing protrudes from the spring contact element.

8. The conductor connection terminal according to claim 7, wherein two contact tongues protrude from the spring contact element, wherein at a free end of the contact tongues, a contact tab for electrically conductive contacting of the first busbars of the first insulating material housing and the second busbar of the second insulating material housing is arranged.

9. The conductor connection terminal according to claim 1, wherein the first insulating material housing and the second insulating material housing are directly or indirectly fixed to each other.

10. The conductor connection terminal according to claim 9, wherein the first base side of the first insulating material housing and the second base side of the second insulating material housing are connected to each other.

11. The conductor connection terminal according to claim 9, wherein the first base side of the first insulating material housing and the second base side of the second insulating material housing are each arranged on opposite sides of a connecting element.

12. The conductor connection terminal according to claim 11, wherein the first base side of the first insulating material housing and/or the second base side of the second insulating material housing has a latching opening, and wherein the latching opening is formed for latching with a corresponding latching crosspiece of the connecting element.

13. The conductor connection terminal according to claim 11, wherein a second latching opening is arranged on the connecting element, wherein the second latching opening is formed for latching with a corresponding second latching crosspiece, and wherein the second latching crosspiece is arranged on the first base side of the first insulating material housing and/or on the second base side of the second insulating material housing.

* * * * *